L. S. LACHMAN.
ELECTRIC WELDING.
APPLICATION FILED OCT. 15, 1908.
1,004,795.
Patented Oct. 3, 1911.
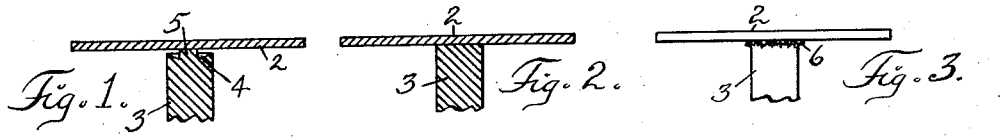
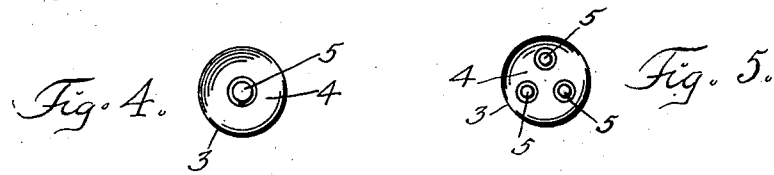
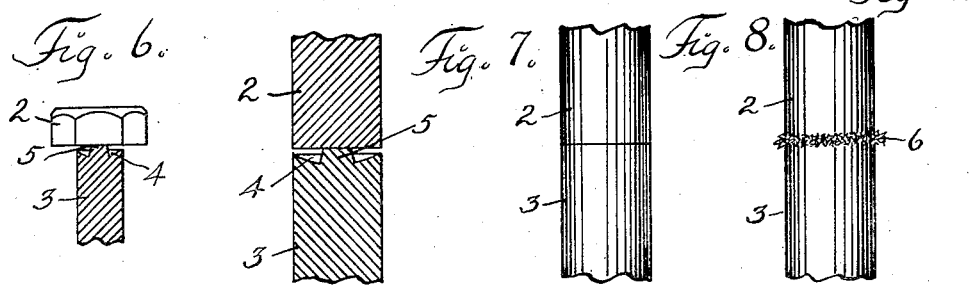
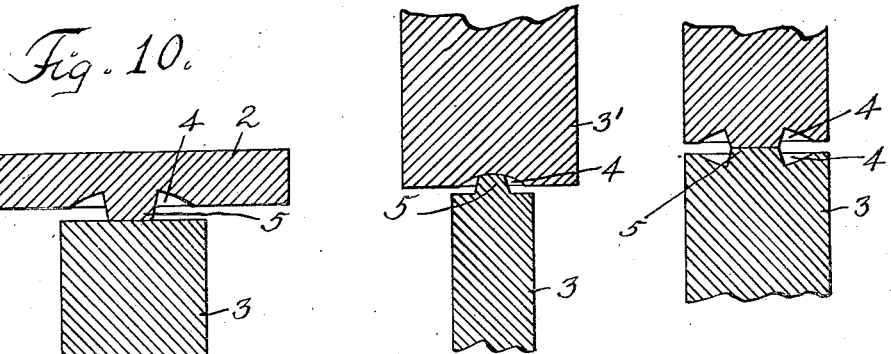
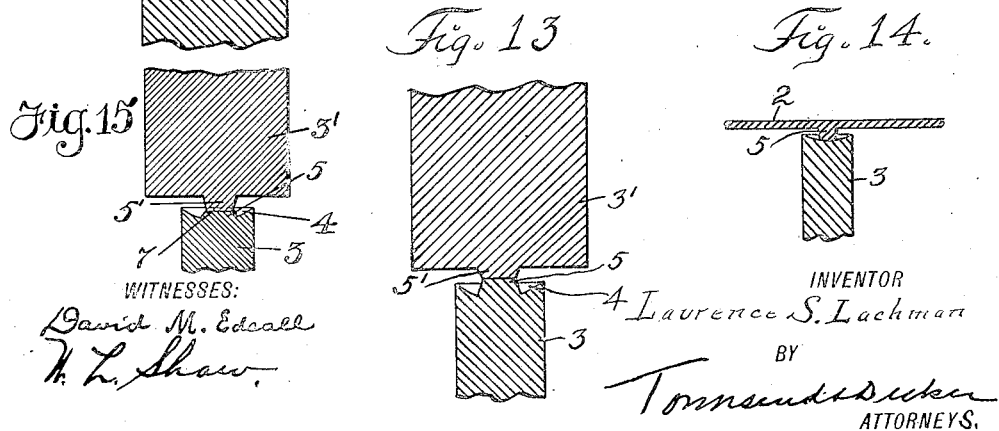
WITNESSES:
David M. Edsall
W. L. Shaw
INVENTOR
Laurence S. Lachman
BY
Townsend & Decker
ATTORNEYS.

UNITED STATES PATENT OFFICE.

LAURENCE S. LACHMAN, OF NEW YORK, N. Y., ASSIGNOR TO UNIVERSAL ELECTRIC WELDING COMPANY, OF NEW YORK, N. Y., A CORPORATION OF NEW YORK.

ELECTRIC WELDING.

1,004,795.  Specification of Letters Patent.  Patented Oct. 3, 1911.

Application filed October 15, 1908. Serial No. 457,800.

*To all whom it may concern:*

Be it known that I, LAURENCE S. LACHMAN, a citizen of the United States, and a resident of New York, in the county of New York and State of New York, have invented certain new and useful Improvements in Electric Welding, of which the following is a specification.

My invention relates to the art of welding pieces of metal to one another by the well known process of electric welding in which the pieces are heated at the welding point by passing a heavy electric current from one to the other while they are in contact and then applying pressure to effect the weld.

The invention is especially useful in uniting pins, rods, or bars at their end to plates or sheets of metal or to the surface of other pieces or blocks of metal or to pins, rods or bars of identical form and dimensions in cross-section. It is also of particular value in the manufacture of headed pins or rods, as for instance, bolts or screws.

Some of the multifarious applications of the invention will be described in connection with the accompanying drawings which show a few of the ways in which the invention may be practiced and some of the forms of metal pieces which may be united according to said invention.

When employed for uniting the end of a pin or rod to the face of a rather thin plate or sheet of metal, the invention is a valuable substitute for riveting and produces a union which will not mar the surface of the opposite side of said plate to that to which the pin is secured, and which will further be free from any bur or disfigurement at the edge or around the edge of the pin where it meets the surface of the plate, which bur or displaced metal, would, if the union were effected in the manner employed in ordinary electric welding operations have to be removed in some way to afford a clean finish.

In the manufacture of headed pins, bolts, screws or similar devices it is also especially useful since the union of the pin or stem thereof with the head is free from any disfigurement or enlargement from the presence of the bur which ordinarily is produced by an electric butt welding of the pin and its head.

In the drawings Figure 1 shows a plate and pin as prepared and assembled for the butt-welding of the end of the pin to the plate in accordance with my invention, the parts being shown in cross-section. Fig. 2 shows a completed joint in cross section. Fig. 3 shows in side elevation the result of attempting to weld a pin by its end to the surface of a plate in the ordinary manner, heretofore employed. Fig. 4 is an end view of the pin or rod shown in Fig. 1 enlarged. Fig. 5 is an end view of a modification in the formation of the end of the pin preliminary to the welding operation. Fig. 6 illustrates the welding of the stem and head of a bolt to one another. Fig. 7 illustrates the welding of two rods or pins end to end. Fig. 8 shows the result of welding said pins or rods to one another when they are prepared for welding as shown in Fig. 7. Fig. 9 shows the result of welding said rods or pins together end to end by the usual process heretofore employed. Figs. 10, 11, 12, 13, 14 and 15 illustrate modifications of my invention and will be described in detail in the body of the specification.

Referring to Fig. 1, 2 is a plate of metal and 3 a pin to be welded at its end to the face of said plate. 4 is a countersink formed in the end of the rod or pin 3. If the plate or block to which the pin is to be secured be somewhat thicker this cavity might be formed in said plate or block instead of in the end of the pin or rod, as indicated in Fig. 10. 5 is a projection of reduced area or size rising from the end of the pin within the countersink and above the wall or edge thereof for making initial contact of reduced area with the opposite plate or piece of metal, in order to localize the flow of current and the heating effect in the initial stages of the electric welding operation, as well understood in the art.

When the parts are forced together the laterally displaced metal is received in the cavity 4 and is closed in by the meeting portion of the pieces 2, 3, where they meet around said cavity or countersink, the result being that the bur or displaced metal is retained and concealed within said cavity and a clean finish and sharp line of meeting at the end of the pin and face of the plate is secured as illustrated in Fig. 5. Obviously no further operation is required and there is no necessity for removing a bur, such as indicated at 6, in Fig. 3, which bur would result, if the end of the pin or rod were pointed in the ordinary way used in the butt welding of rods electrically and without the provision of any bur-receiving cavity as employed by me.

As indicated in Fig. 5, a number of initial contact projections may be employed within the boundaries of the countersink or cavity 4.

Fig. 6 illustrates the application of the invention to a headed pin or rod such as a bolt in which the end of the pin or rod is to be welded to the head. In this, as in the other instances, shown in the drawing, the complete concealment of the bur or displaced metal is due to the conformation of the meeting portions of the welded pieces, said meeting portions being so conformed or proportioned that the edges of the cavity will be embraced within the boundaries of the face of the opposite portion and said cavity will thereby be closed over its top and around its edges.

Fig. 7 differs only from Fig. 6 in showing the application of the invention to the butt welding of two similar rods, bars, pieces or blocks together end to end and Fig. 8 shows how the forcing of the pieces together until they meet around the edge of the cavity will give a finished joint without the presence of any outside bur or displaced metal such as results from the ordinary process of butt welding rods or bars together, and as indicated in Fig. 9 where 6 shows the bur.

Fig. 10 differs only from Fig. 1 in illustrating a somewhat thicker plate of metal 2 in which instance, as already stated, the cavity 4 might be formed in said plate. The welding or contact projection is also here shown as rising from the cavity or countersink, but, as shown in Fig. 11, the countersink or cavity 4 might be in one piece and the welding point or projection 5 in the opposite piece, said opposite piece being formed, as already described, however, so as to close in the cavity around its edge when the pieces are caused to meet fully by the operation of forcing them against one another to complete the weld.

Fig. 12 simply shows how the cavity or countersink and a welding projection might be formed on each of the two pieces to be welded.

Fig. 13 shows how a piece of comparatively small dimensions in cross section may be formed for union by butt welding to a piece of larger cross sectional area. The piece 3 or smaller piece has the cavity or countersink 4 and the welding projection 5 as before, but to facilitate the welding operation the opposite or larger piece 3' may be also formed with a welding projection or point 5' adapted to be heated and to be retained and concealed within said cavity 4 by reason of the overlapping of the meeting portions of the pieces when welded together and the inclusion of the edges of the cavity within the boundaries of the closing portion of the opposite piece.

Obviously, it is not necessary that the projecting portion 5 on the piece having the countersink should extend beyond the bounding wall of the countersink but that it might lie entirely below the level of said edge and be met by a projection 5' extending to the necessary distance from the opposite piece. This is indicated in Fig. 15 by the line 7 showing the meeting line of said projections under such a condition.

Fig. 14 shows a further possible modification of my invention when used in uniting a pin or rod to the face of a plate end on. As here shown, the cavity or bur receiving countersink might be formed in the end of the rod and the initial contact projection might extend from the plate to contact with the floor of the cavity or countersink.

What I claim as my invention is:—

1. The improved method of uniting a pin or rod to a plate consisting in forming a countersink in the end of the pin or rod and one or more projections extending beyond the outer wall of the countersink and uniting the pin or rod to the plate by an electric butt welding operation.

2. The improvement in the electric butt welding of the ends of pins, rods or bars to another piece of metal consisting in providing the end of said pin, rod or bar with a countersink and with one or more projections of reduced size projecting above the wall of the countersink and adapted to form initial electric contact with the opposite piece, and uniting the parts by the butt welding process.

3. The improvement in electrically welding a rod to a larger piece of metal consisting in providing a countersink at the meeting surfaces of the rod and companion piece and applying welding pressure to force the bur or displaced metal into the countersink and to conceal such metal by the meeting portions of the rod and companion piece.

Signed at New York in the county of New York and State of New York this 12th day of October A. D. 1908.

LAURENCE S. LACHMAN.

Witnesses:
C. T. TISCHNER, Jr.,
N. L. SHAW.